United States Patent Office 3,845,204
Patented Oct. 29, 1974

3,845,204
SOMATOSTATIN AS INHIBITING AGENT IN
PROLACTIN RELEASE
Norman H. Grant, Wynnewood, Pa., assignor to American Home Products Corporation, New York, N.Y.
No Drawing. Filed May 22, 1973, Ser. No. 362,692
Int. Cl. C07c 103/52
U.S. Cl. 424—177   6 Claims

ABSTRACT OF THE DISCLOSURE

Somatostatin and its linear counterpart are described as inhibiting the release of prolactin in *in vitro* tests.

This invention relates to the tetradecapeptide somatostatin and its novel linear counterpart and the use of these tetradecapeptides in the inhibition of prolactin release and in the treatment of conditions requiring regulation of the release of such material.

Somatostatin is the tetradecapeptide

H-Ala-Gly-Cys-Lys-Asn-Phe-Phe-Trp-Lys-Thr-Phe-Thr-Ser-Cys-OH.

This tetradecapeptide has only recently been identified by isolation from extracts of ovine hypothalamic tissues and found to inhibit the secretion of growth hormone (GH); See Brazeau et al., Science, *179* pp. 77–79 (January 1973). This same tetradecapeptide has also been reported by Brazeau et al., supra, to have been synthesized by solid phase methodology and found to have the same biological activity as the somatostatin obtained from a natural source. In addition the solid phase synthesis of H - Ala - Gly - Cys-Lys-Asn-Phe-Phe-Trp-Lys-Thr-Phe-Thr-Ser-Cys-OH, the linear form of somatostatin, has been reported.

The present invention relates to the discovery that somatostatin and its linear counterpart are useful in the treatment of a host requiring the regulation of prolactin release. As used herein somatostatin means the tetradecapeptide of the formula H-Ala-Gly-Cys-Lys-Asn-Phe-Phe-Trp-Lys-Thr-Phe-Thr-Ser-Cys-OH, whether obtained from natural sources or made synthetically. It also includes those materials of natural origin which contain somatostatin in non-isolated form such as extract of ovine hypothalamic tissue. The linear counterpart of somatostatin embraced by the present invention is represented by the formula H-Ala-Gly-Cys-Lys-Asn-Phe-Phe-Trp-Lys-Thr-Phe-Thr-Ser-Cys-OH. Thus, the structural difference between somatostatin and its linear counterpart is that the former has a bridging bond between the sulfhydryls of the two cysteinyl amino acid residues in the tetradecapeptide. The definition of somatostatin and the linear counterpart of somatostatin also includes those compounds having a side chain protecting group on an amino acid residue of such tetradecapeptide. Thus, for example, the sulfhydryls of the two amino acid residues in the linear compound may have the hydrogen atom replaced by a protecting group such as benzyl, benzyloxycarbonyl, nitrobenzyl, trityl, methoxybenzyl, carboxymethyl, etc. Similarly, as shown in Example 1, protecting groups may be present on the other amino acid residues in the tetradecapeptide having either a side chain hydroxyl or amino substituent. These protecting groups are preferably split off as shown in Example 2 but can remain on the compound when used for the inhibition of prolactin release. Thus, the side chain alcoholic hydroxyl group on the serine and threonine amino acid residues can be protected by such groups as tosyl, acetyl, benzoyl, *tert*-butyl, trityl, benzyl and benzyloxycarbonyl. The protecting groups for the side chain amino group on lysine are illustrated by benzyl, benzyloxycarbonyl, tosyl, t-butyloxycarbonyl, 2,4-dinitrophenyl, t-amyloxycarbonyl, etc.

In selecting a particular side chain protecting group to be used in the synthesis of the tetradecapeptides described herein, the following rules should be followed: (a) the protecting group must be stable to the reagent and under the reaction conditions selected for removing the α-amino protecting group at each step of the synthesis, (b) the protecting group msut retain its protecting properties (i.e. not be split off under coupling conditions, and (c) the side chain protecting group must be removable upon the completion of the synthesis containing the desired amino acid sequence under reaction conditions that will not alter the peptide chain.

Also included within the scope of the present invention are non-toxic acid addition salts of somatostatin and its linear counterpart such as hydrochloride, hydrobromide, sulfate, phosphate, maleate, acetate, citrate, benzoate, succinate, malate, ascorbate, and the like.

Prolactin is an adenohypophysical hormone the action of which is associated with numerous effects including reproduction or parental care in a diversity of animals from teleost fishes to mammals. A listing of prolactin actions related to reproduction and parental care appears and is discussed by Turner et al., at page 107 of General Endocrinology 5th Ed. 1971 (W. B. Saunders Co.). These authors also indicate at page 108 that prolactin has an effect on stimulation of mammary gland development and lactation in mammals. Thus, materials such as somatostatin and its linear counterpart, in inhibiting prolactin release from the pituitary, have application in the regulation and control of post partum lactation in a mammal requiring such treatment.

The following examples are illustrative of the preparation of somatostatin and its linear counterpart.

EXAMPLE 1

L - Alanylglycyl - S - p-methoxybenzyl-L-cysteinyl-N-carbobenzoxy - L - lysyl-L-asparaginyl-L-phenylalanyl-L - phenylalanyl - L - tryptophyl-L-lysyl-O-benzyl-L-threonyl - L - phenylalanyl - O - benzyl - L - threonyl-O-benzyl-L-seryl-1-S-p-methoxybenzyl-L-cysteine resin Chloromethylated resin 12.0 g. (received from Bio Rad: Bio Beads SX–1 200–400 mesh chloromethylated 1.25 meg./g.) is gently refluxed with 5.1 g. of Boc-S-p-methoxybenzyl-cysteine in 45 ml. of absolute alcohol and 1.95 ml. of triethylamine under mechanical stirring for 48 hours. After thorough washes with alcohol the resin is dried *in vacuo* to weigh 13.5 g. The resin is then placed in a Merrifield vessel and deprotected with a mixture of trifluoroacetic, acid methylene chloride (1:1) containing 5% ethane dithiol (3 times for 10 minutes each). The resin is subsequently washed with methanol (2 times), methylene chloride (2 times) 12.5% triethylamine in dimethylformamide (3 times), methanol (2 times), methylene chloride (2 times). The ninhydrin test is then strongly positive. The protected amino acids are then added one by one, starting with t-Boc-O-benzyl-L-serine (8.85 g./30 ml. 1M DCC, 18 hours) and the coupling mediated by 1M dicyclohexyl carbodiimide in dimethylformamide in a medium of dimethylformamide; methylene chloride (1:1). Deblocking and wash cycles are as indicated above, and the course of the synthesis is monitored by the ninhydrin test.

Following the coupling of t-Boc-O-benzyl-L-serine, the resin is removed and the synthesis is continued with ⅔ of the original amount. After deblocking, t-Boc-O-benzyl-L-threonine (3.68 g./12 ml. 1M DCC, 18 hours) is added. The synthesis is continued with the following protected amino acids: t-Boc-L-phenylalanine (3.17 g./12 ml. 1M DCC, 3 hours); t-Boc-O-benzyl-L-threonine (3.68 g./12 ml. 1M DCC, 15 hours); -t-Boc-ξ-carbobenzoxy-L-lysine (4.54 g./12 ml. 1M DCC, 18 hours); t-Boc-L-tryptophan (3.63 g./12 ml. 1M DCC, 3 hours); t-Boc-L-phenylalanine (3.7 g./12 ml. 1M DCC, 18 hours); t-Boc-L-phenylalanine (3.7 g./12 ml. 1M DCC, 3 hours); t-Boc-L-asparagine (2.77 g./12 ml. 1M DCC, 18 hours) followed by 1.38 g. t-Boc-L-asparagine and 6 ml. of 1M DCC (4 hours); α-t-Boc-ξ-carbobenzoxy-L-lysine (4.54 g./12 ml. DCC, 18 hours); t-Boc-S-p-methoxybenzyl-L-cysteine (4.05 g./12 ml. 1M DCC, 18 hours); t-Boc-glycine (2.08 g./12 ml. 1M DCC, 18 hours); carbobenzoxy-L-alanine (2.67 g./12 ml. 1M DCC, 3 hours). The addition of t-Boc-L-asparagine may result in formation of nitrile at the β carboxamide function and the synthesis is better carried out by coupling an active ester of t-Boc-L-aparagine. However, subsequent treatment of the product with liquid HF might convert possibly formed nitrile back to the desired carboxamide. After the synthesis is completed, the resin is removed from the vessel, washed with methanol and dried *in vacuo* (13.0 g. total weight).

EXAMPLE 2

Acetate salt of L-alanylglycyl-L-cysteinyl-L-lysyl-L-asparaginyl - L - phenylalanyl - L-phenylalanyl-L-tryptophyl-L-lysyl-L-threonyl - L - phenylalanyl - L - thereonyl-L-seryl-L-cysteine The above resin (5.0 g.) obtained in Example 1 is dissolved in 5.5 ml. of liquid hydrogen fluoride and 15 ml. of anisole and reacted for 1 hour at 0° C. Then hydrogen fluoride is removed as quickly as possible, the resin is washed with ether, degased 10% acetic acid and methanol. The aqueous extract is lyophilized to leave 1.38 g. of an off white powder.

The above powder (700 mg.) is dissolved in 0.2N acetic acid containing 3% mercaptoethanol and applied on a Sephadex 9–25 F column (120 cm. x 3 cm.) previously equilibrated with 0.2N acetic acid, 3% in mercaptoethanol and fractions of 13 ml. each are taken. The material is eluted in three fractions: 30—34 (134 mg.) A, 35–42 (235 mg.), B, and 43–52 (178 mg.) C. On thin layer chromatography (Bu:AcOH:H$_2$O.EtOAc-1:1:1:1)

fractions A and B were indistinguishable, showing one streaking spot (Rf 0.7), fraction C showed three spots (somewhat streaky).

A sample of Fraction B is hydrolyzed in 6N HCl under a nitrogen blanket at 138° C. for 4 hours. The following amino acid analysis is obtained: Asp 1.00 (1), Thr 1.80 (2); Ser 0.58 (1); Gly 1.35 (1); Ala 1.18 (1); Phe 2.40 (3); Lys 2.00 (2); Cys 0.63 (2).

EXAMPLE 3

Somatostatin

A linear tetradecapeptide having the structure of Example 2 (56 mg.) is dissolved in 1% aqueous ammonium acetate (120 ml.) and the pH adjusted to 8.4 by the addition of 1% ammonium carbonate (38 ml.). The reaction mixture is allowed to stand in air during 60 hours. The solution pH drops to 8.19. The total reaction mixture is lyophilized (thrice) both to ensure removal of buffer and to contain the sample in progressively smaller vessels. The residue is subjected to a partition chromatography on Sephadex G-25 BAW column (BAW=n-butanol:acetic acid:water 4:1:5; 60 x 1 cm. column with a void volume, V$_0$=14 ml.). Eluted fractions monitored by ultra-violet absorbance at 280 mμ reveal minor peaks at 1 V$_0$ and 2 V$_0$. A major peak of ninhydrin positive material occurs at 3 V$_0$. Evaporation and lyophilization of the major peak yields 15.5 mg. of white solid (yield 27%) [α]$_D^{26}$ —31° (c, 0.46 in 1% HOAc). It shows one ninhydrin-positive spot in three tlc systems using Eastman "chromagram" SiO$_2$ TLC sheets plates. R$_f$'s obtained in 1. Butanol:acetic acid:water—4:1:5 (top phase)—0.33
2. Isopropanol: 1N aqueous acetic acid—2:1–0.59.
3. Isopropanol: 1N ammonium hydroxide—2:1–0.26.

Amino acid analysis after hydrolysis in 6N HCl containing 0.5% thioglycollic acid: Asp, 1.0; 2 Thr, 1.9; Ser, 0.7; Gly, 1.0; Ala, 1.0; 3 Phe, 3.2; 2 Lys, 2.1; NH$_3$, 1.7; Trp, 1.1; Cys, 1.8.

EXAMPLE 4

Di-S-carboxymethyl Somatostatin

To 3.6 mg. (1.48 μ mole) of peptide is added 60 μl. (0.86 mmole) of 2-mercaptoethanol in 400 μl. of 0.5M trimethylammonium acetate buffer (pH 8.5). The mixture is incubated for 4.5 hours at room temperature, after which 20 μl. of glacial acetic acid is added and the solution is lyophilized. To the reduced peptide in 800 μl. of 0.5M pyridine acetate-0.005M 2-mercaptoethanol buffer (pH 6.0) is added 200 μl. of 0.1M iodoacetic acid in the same buffer. After incubation at room temperature for 20 minutes with occasional mixing, 12 μl. (200 μ mole) of 2-mercaptoethanol is added and the mixture is allowed to stand at room temperature for an additional 15 minutes; 40 μl. of acetic acid is then added, and the solution is lyophilized. The residue is twice dissolved in 400 μl. of 0.1M acetic acid containing 12 μl. of 2-mercaptoethanol and lyophilized. The product is hydroscopic and gummy until subsequent treatment with absolute ethanol and drying under vacuum. This product is also described by Burgus et al., Proc. Nat. Acad, Sci. *70*, 684 (1973).

The prolactin release inhibiting activity of the compounds of Examples 2 through 4 was determined by radioimmunoassay in a rat pituitary cell culture system as describd by Vale et al., Endocrinology *91*, pp. 562 (1972) and Grant et al., Biochemical and Biophysical Research Communications *51*, pp. 100–106 (1973). The compound of Example 3 was tested as low as 10 ηg./ml. and was found active in inhibiting prolactin release. The compound of Example 4 was tested at 50 and 10 μg./ml. and was active at both concentrations in inhibiting prolactin release. The compound of Example 2 was tested in the foregoing procedure and prolactin inhibition was achieved at concentrations from 25 ηg./ml. to 100 μg./ml.

The compounds described herein may be administered to warm blood mammals, including humans, either intravenously, subcutaneously, intramuscularly or orally. The contemplated dose range for oral administration in tablet or capsule form to large mammals is about 0.015 mg. to about 7 mg./kg. of body weight per day while the dose range for intravenous injection in an aqueous solution is about 0.1 μg. to about 0.15 mg./kg. of body weight per day. When adiminstered subcutaneously or intramuscularly a dose range of about 1.5 μg. to about 0.7 mg./kg. of body weight per day is contemplated. Obviously, the required dosage will vary with the particular condition being treated, the severity of the condition and the duration of treatment.

If the active ingredient is administered in tablet form the tablet may conain: a binder such as gum tragacanth, corn starch, gelatin, an excipient such as dicalcium phosphate; a disintegrating agent such as corn starch, alginic acid, etc.; a lubricant such as magnesium stearate; and a sweetening and/or flavoring agent such as sucrose, lactose, wintergreen, etc. Suitable liquid carriers for intravenous administration include isotonic saline, phosphate buffer solutions, etc.

What is claimed is:

1. A method of inhibiting the release of prolactin in a mammal requiring inhibition of prolactin release, which comprises administering to said mammal an effective amount for inhibiting prolactin release of a material selected from the class consisting of H-Ala-Gly-Cys-Lys-Asn-Phe-Phe-Trp-Lys-Thr-Phe-Thr-Ser-Cys-OH, (I)

H-Ala-Gly-C̄ys-Lys-Asn-Phe-Phe-Trp-Lys-Thr-Phe-Thr-Ser-Cys-OH, (II)

and the non-toxic acid addition salts thereof, said material of formula II being optionally substituted with a protecting group on the sulfhydryl moiety of each cysteinyl amino acid residue in said material of formula II, said protecting group being selected from the group consisting of benzyl, benzyloxycarbonyl, nitrobenzyl, trityl, methoxybenzyl and carboxymethyl.

2. A method according to claim 1 wherein said material of formula I is obtained from hypothalamic tissue.

3. A method according to claim 2 wherein said protecting group linked to the sulfhydryl moiety is carboxymethyl.

4. A method of inhibiting the release of prolactin in a warm blooded mammal requiring inhibition of prolactin release which comprises administering to said mammal an effective amount for inhibiting prolactin release of a material selected from the class consisting of (a) L-alanylglycyl-L-cystinyl - L - lysyl-L-asparaginyl - L - phenylalanyl-L-phenylalanyl - L - tryptophyl-L-lysyl-L-threonyl-L-phenylalanyl - L - threonyl-L-seryl - L - cystine, (b) L-alanylglycyl - L - cysteinyl-L-lysyl - L - asparaginyl-L-phenylalanyl - L - phenylalanyl-L-tryptophyl-L-lysyl-L-threonyl-L-phenylalanyl-L-threonyl-L-seryl-L-cysteine, (c) L - alanylglycyl - L-cysteinyl(S-carboxymethyl)-L-lysyl-L-asparaginyl - L-phenylalanyl-L-phenylalanyl-L-tryptophyl-L-lysyl - L - threonyl - L - phenylalanyl-L-threonyl-L-seryl-L-cysteine(S-carboxymethyl), and (d) a non-toxic acid addition salt of (a), (b) or (c), said material being administered either orally, intravenously, subcutaneously or intramuscularly.

5. A method according to claim 4 wherein said material is L-alanylglycyl-L-cystinyl-L-lysyl-L-asparaginyl-L-phenylalanyl - L - phenylalanyl - L - tryptophyl-L-lysyl-L-threonyl-L-phenylalanyl-L-threonyl-L-seryl-L-cystine or a non-toxic acid addition salt thereof.

6. A method according to claim 4 wherein said material is L-alanylglycyl-L-cysteinyl-L-lysyl-L-asparaginyl-L-phenylalanyl - L - phenylalanyl - L - tryptophyl-L-lysyl-L-threonyl-L-phenylalanyl-L-threonyl-L-seryl-L-cysteine or a non-toxic acid addition salt thereof.

No references cited.

ELBERT L. ROBERTS, Primary Examiner

U.S. Cl. X.R.

260—112.5

UNITED STATES PATENT OFFICE
CERTIFICATE OF CORRECTION

Patent No. 3,845,204                    Dated October 29, 1974

Inventor(s)   Norman H. Grant

It is certified that error appears in the above-identified patent and that said Letters Patent are hereby corrected as shown below:

Column 4, line 40, "$\eta$" should be --n--;

line 46, "$\eta$" should be --n-- and

Column 5, (claim 3, line 1) change "2" to --1--.

Signed and sealed this 28th day of January 1975.

(SEAL)
Attest:

McCOY M. GIBSON JR.
Attesting Officer

C. MARSHALL DANN
Commissioner of Patents